United States Patent
Tung

(10) Patent No.: US 7,949,898 B2
(45) Date of Patent: May 24, 2011

(54) MULTI-MICROPROCESSOR SYSTEM AND CONTROL METHOD FOR THE SAME

(75) Inventor: Wei-Chun Tung, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 211 days.

(21) Appl. No.: 12/371,139

(22) Filed: Feb. 13, 2009

(65) Prior Publication Data

US 2009/0210657 A1   Aug. 20, 2009

(30) Foreign Application Priority Data

Feb. 15, 2008   (TW) ............................... 97105274 A

(51) Int. Cl.
*G06F 11/00* (2006.01)
(52) U.S. Cl. .......................................... 714/23; 714/48
(58) Field of Classification Search .............. 714/23, 714/11–13, 4, 46, 47, 48, 4.1, 4.11, 4.12, 714/47.1
See application file for complete search history.

(56) References Cited

U.S. PATENT DOCUMENTS

| | | | |
|---|---|---|---|
| 5,452,443 A * | 9/1995 | Oyamada et al. ............... | 714/10 |
| 5,668,714 A | 9/1997 | Morikawa | |
| 5,796,937 A * | 8/1998 | Kizuka ........................... | 714/13 |
| 6,574,748 B1 * | 6/2003 | Andress et al. ................. | 714/11 |
| 2003/0140285 A1 * | 7/2003 | Wilkie ........................... | 714/48 |
| 2006/0010344 A1 | 1/2006 | Zorek, Sr. et al. | |
| 2006/0294422 A1 * | 12/2006 | Fukuda ........................... | 714/15 |

FOREIGN PATENT DOCUMENTS

| CN | 1129857 C | 12/2003 |
|---|---|---|
| CN | 1786917 A | 6/2006 |

\* cited by examiner

*Primary Examiner* — Dieu-Minh Le
(74) *Attorney, Agent, or Firm* — WPAT, PC; Justin King

(57) ABSTRACT

A multi-microprocessor system and a control method for the same are provided. The multi-microprocessor system includes a first microprocessor and a second microprocessor. The second microprocessor is coupled to the first microprocessor. The second microprocessor transmits a detecting signal to the first microprocessor and determines a state of the first microprocessor by monitoring the first microprocessor for a predetermined time period. In the event that the first microprocessor crashes, the first microprocessor is immediately rest or restarted by the second microprocessor in order to maximize stability of the multi-microprocessor system.

17 Claims, 3 Drawing Sheets

MULTI-MICROPROCESSOR SYSTEM AND CONTROL METHOD FOR THE SAME

FIELD OF THE INVENTION

The present invention relates to a microprocessor system and a control method for the same, and more particularly, to a multi-microprocessor system and a control method for the same.

BACKGROUND OF THE INVENTION

Microprocessors provide algorithmic operating, logic processing and peripheral circuit controlling functions. Operating convenience of an interface between an apparatus and a user is significantly extended by implementing microprocessors in electronic apparatuses. For example, televisions, video recorders and video players are internally provided with microprocessors for controlling operations of an entire system.

In the evolution of microprocessors, low-end 8-bit microprocessors like Intel® 8051 were first developed. Accompanied with progressing technology, high-end 16-bit and 32-bit microprocessors entered the market with splendor one after the other, such that applications of microprocessors have become more and more prevailing. From toys, household appliances, automobiles to consumer electronic devices, microprocessors are used therein.

However, under a diversity of application environments, in order to optimize system performance, techniques of microprocessors need not only offer fast operation with extensive applications, but also have sustainable and stable operating characteristics under operating systems. In a conventional single-microprocessor system, hardware of the entire microprocessor is necessarily reset when a microprocessor crashes, followed by loading program codes to be performed by the microprocessor using a boot loader to complete a reset or restart procedure. However, such reset or restart method results in loss of previous user-defined setting values or operation contents. Therefore, there is a need to provide a solution for maximizing operating stability of microprocessors.

SUMMARY OF THE INVENTION

The invention discloses a multi-microprocessor system and a control method for the same, which maximize operating stability of a first microprocessor to optimize system performance by monitoring a state of the first microprocessor using a second microprocessor.

The invention provides a multi-microprocessor system comprising a first microprocessor and a second microprocessor. The second microprocessor is coupled to the first microprocessor. The second microprocessor transmits a detect signal to the first processor and determines a state of the first microprocessor by monitoring the first microprocessor for a predetermined time period.

The invention provides a control method for a multi-processor system, wherein the multi-processor system comprises a first microprocessor, and a second microprocessor coupled to the first microprocessor. The control method comprises steps of transmitting a detect signal by the second microprocessor to the first microprocessor, and determining a state of the first microprocessor by the second microprocessor by monitoring the first microprocessor for a predetermined time period.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

A multi-microprocessor system according to the invention comprises a first microprocessor and a second microprocessor. The second microprocessor is coupled to the first microprocessor, and is for monitoring the first microprocessor. When monitoring the first microprocessor, the second microprocessor transmits a detect signal to the first processor. The second microprocessor determines a state of the first microprocessor according to whether the first microprocessor responds to the detect signal or not after having waited for a predetermined time period. Preferred embodiments of the invention shall be described hereinafter.

First Embodiment

Figure 1:
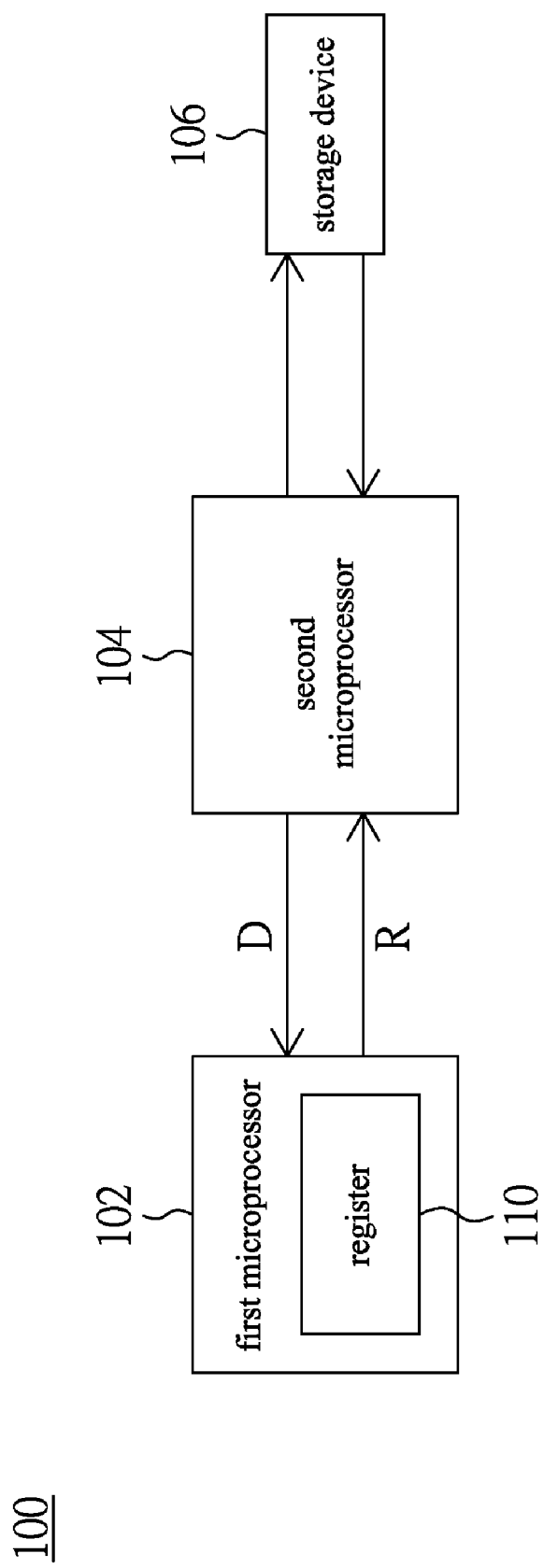
FIG. 1 is a block diagram of a multi-microprocessor system according to a first embodiment of the invention.

Referring to FIG. 1 showing a block diagram of a multi-microprocessor system according to a first embodiment of the invention, a multi-microprocessor system 100 comprises a first microprocessor 102, a second microprocessor 104, and a storage device 106. The second microprocessor 104 is coupled to the first microprocessor 102, and is for monitoring the first microprocessor 102.

Figure 2:
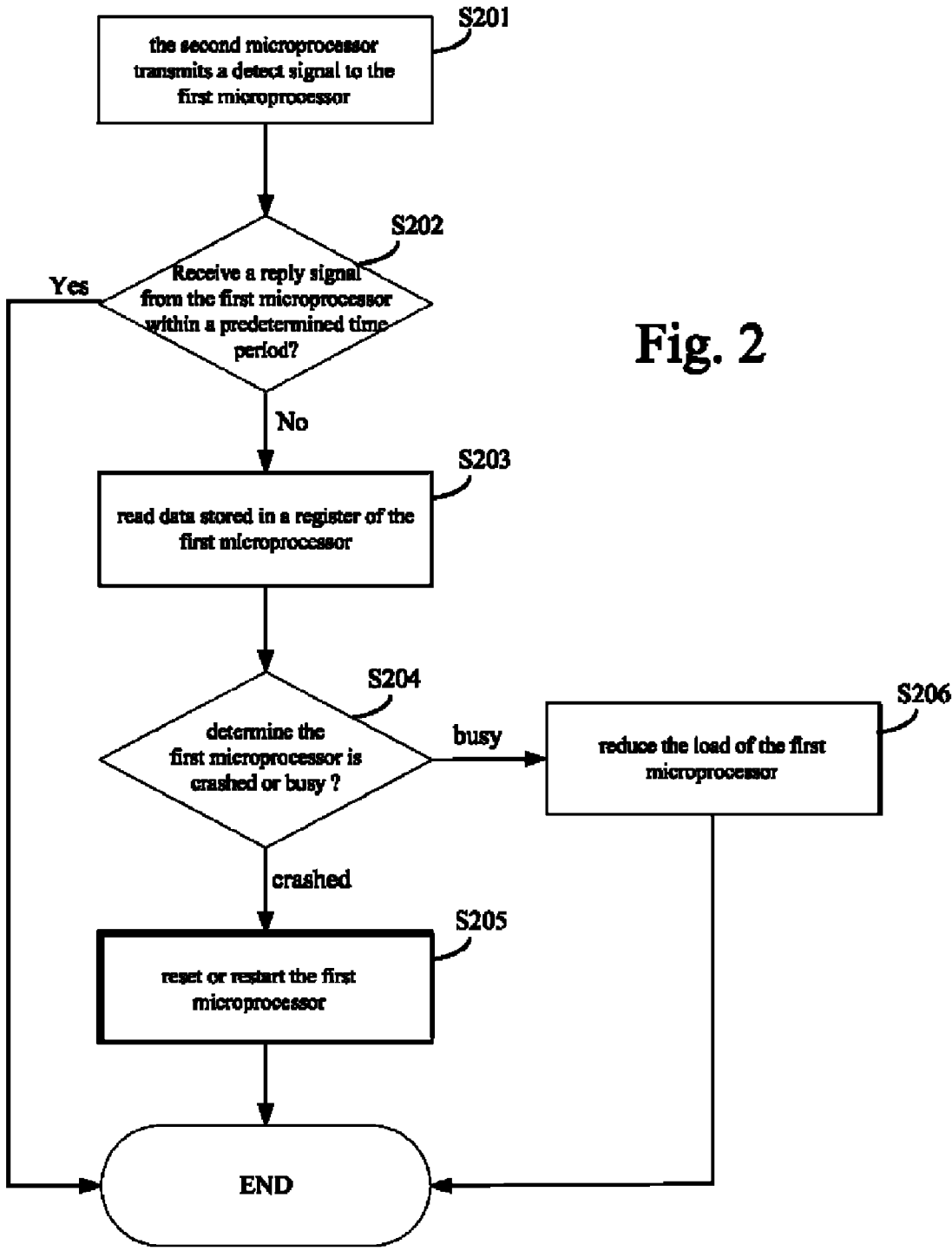
FIG. 2 is a flow diagram of a control method of the multi-microprocessor system shown in FIG. 1.

Please refer to FIG. 2. FIG. 2 shows a flow diagram of a control method of the multi-microprocessor system shown in FIG. 1. When monitoring the first microprocessor 102, the second microprocessor 104 transmits a detect signal D to the first microprocessor 102, as shown in step S201. Then, the second microprocessor 104 determines the state of the first microprocessor 102 according to whether it receives a reply signal R from the first microprocessor 102, as shown in step S202. In the event that the second microprocessor 104 does not receive the reply signal R from the first microprocessor 102 after the predetermined time period, the second microprocessor 104 determines the state of the first microprocessor 102 as being crashed or busy. For double check purpose, the second microprocessor 104 can transmit the detect signal D again to the first microprocessor 102 when not receiving the reply signal R from the first microprocessor 102.

In step S203, the second microprocessor 104 reads data stored in a register 110 of the first microprocessor 102. In step S204, the second microprocessor 104 determines whether the first microprocessor 102 is crashed or busy according to the data in the register 110 of the first microprocessor 102. The register 110 stores operation data of the first microprocessor 102 for example, wherein the operation data is for an operation being performed or to be performed by the first microprocessor 102. By analyzing operation data stored in the register 110, the state of the microprocessor 102 is obtained. The state may include being crashed, busy, and normal, or other special conditions. The second microprocessor 104 determines the current state of the first microprocessor 102 according to data read from the register 110.

In the event that the second microprocessor 104 determines the first microprocessor 102 as being crashed, the second microprocessor 104 resets or restarts the first microprocessor 102, as shown in step S205.

According to another exemplary embodiment, in the event that the second microprocessor 104 does not receive the reply signal R from the first microprocessor 102, the second microprocessor 104 directly resets or restarts the first microprocessor 102 without determining whether the first microprocessor 102 is crashed or busy.

To reset or restart the first microprocessor 102, the second microprocessor 104 duplicates setting values in the first microprocessor 102 to the storage device 106 before resetting or restarting the first microprocessor 102. When the second microprocessor 104 subsequently resets or restarts the first microprocessor 102, the second microprocessor 104 loads the setting values stored in the storage device 106 back into the first microprocessor 102.

The foregoing setting values include user-defined setting values, for instance. By duplicating the setting values to the storage device 106 and loading the setting values back into the first microprocessor 102, the first microprocessor 102 having been restarted or reset is stored with the same setting values as before being restarted or reset. Thus, after the first microprocessor 102 is restarted or reset, the entire system is restored to user-defined conditions as before the first microprocessor 102 crashed, such that the user does not even experience the crash but smoothly continue in using the system. Further, the setting values may also include variable values of programs executed by the first microprocessor 102 before the first microprocessor 102 crashed. Hence, loaded variable values facilitate the first microprocessor 102 to instantaneously resume an operating state before the crash to complete any unfinished tasks.

In the event that the state of the first microprocessor 102 is busy, the second microprocessor 104 reduces load from the first microprocessor 102, as shown in step S206. That is, when a utilization ratio of the first microprocessor 102 exceeds a threshold, the second microprocessor 104 transfers and performs a share of task from the first microprocessor 102, or even cancels a share of task of the first microprocessor 102, so as to cut down the load of the first microprocessor 102.

Reset or restart procedures according to the microprocessor system of the invention and those of a conventional microprocessor system shall be compared below. In a conventional single-microprocessor system, hardware of the entire microprocessor is necessarily reset when a microprocessor crashes, followed by loading program codes to be performed by the microprocessor using a boot loader to complete a reset or restart procedure. However, such reset or restart method results in loss of previous user-defined setting values or operation contents.

In this embodiment, suppose a micro code of the first microprocessor 102 is stored in the storage device 106 or another storage device (not shown), e.g. a flash memory. The micro code is a code to be executed by the first microprocessor 102 under normal operating conditions. When the second microprocessor 104 resets or restarts the first microprocessor 102, the micro code in the first microprocessor 102 is directly loaded into the first microprocessor 102 from the storage device 106 or the other storage device by means of direct memory access (DMA). To be more exact, in this embodiment, the second microprocessor 104 loads the micro code into the first microprocessor 102 to complete the reset or restart procedure. Thus, time needed to reset or restart the first microprocessor 102 is greatly reduced.

The aforesaid storage device may be but not limited to a flash memory and an erasable programmable read-only memory (EPROM). The storage device 106 may also be memory devices in other forms. Flash memories and EPROM have characteristics of maintaining integrity of stored data when a power supply is cut off. Thus, the first microprocessor 102 is still capable of restoring those previous setting values before the power supply is cut off, thereby elevating usage convenience.

The first microprocessor 102 and the second microprocessor 104 may implement a mailbox of a register as a signal transmission medium. In this embodiment, signal transmission between the first microprocessor 102 and the second microprocessor 104 may be accomplished using an interrupt program. Moreover, for merely illustrative purposes but not to limit the invention within, the first microprocessor 102 may be a high-end microprocessor like a 32-bit microprocessor for executing an operating system, whereas the second microprocessor 104 may be a low-end microprocessor like an 8-bit 8051 microprocessor.

The multi-microprocessor system according to this embodiment may be applied to electronic devices having at least two microprocessors, from digital televisions, multimedia players to handheld electronic devices.

In one preferred embodiment, the second microprocessor 104 transmits the detect signal D to the first microprocessor 102 after every certain time period. That is, the second microprocessor 104 continually monitors the first microprocessor 102 and detects the state of the first microprocessor 102 at all times. In any event that the first microprocessor 102 crashes or becomes busy, the second microprocessor 104 instantly recognizes the situation, and immediately resets or restarts the first microprocessor 102, or reduces the first microprocessor 102's workload. Therefore, conditions before the crash are restored, or the load of the first microprocessor 102 is reduced, thereby maximizing stability and optimizing performance of the multi-microprocessor system 100.

Second Embodiment

Figure 3:
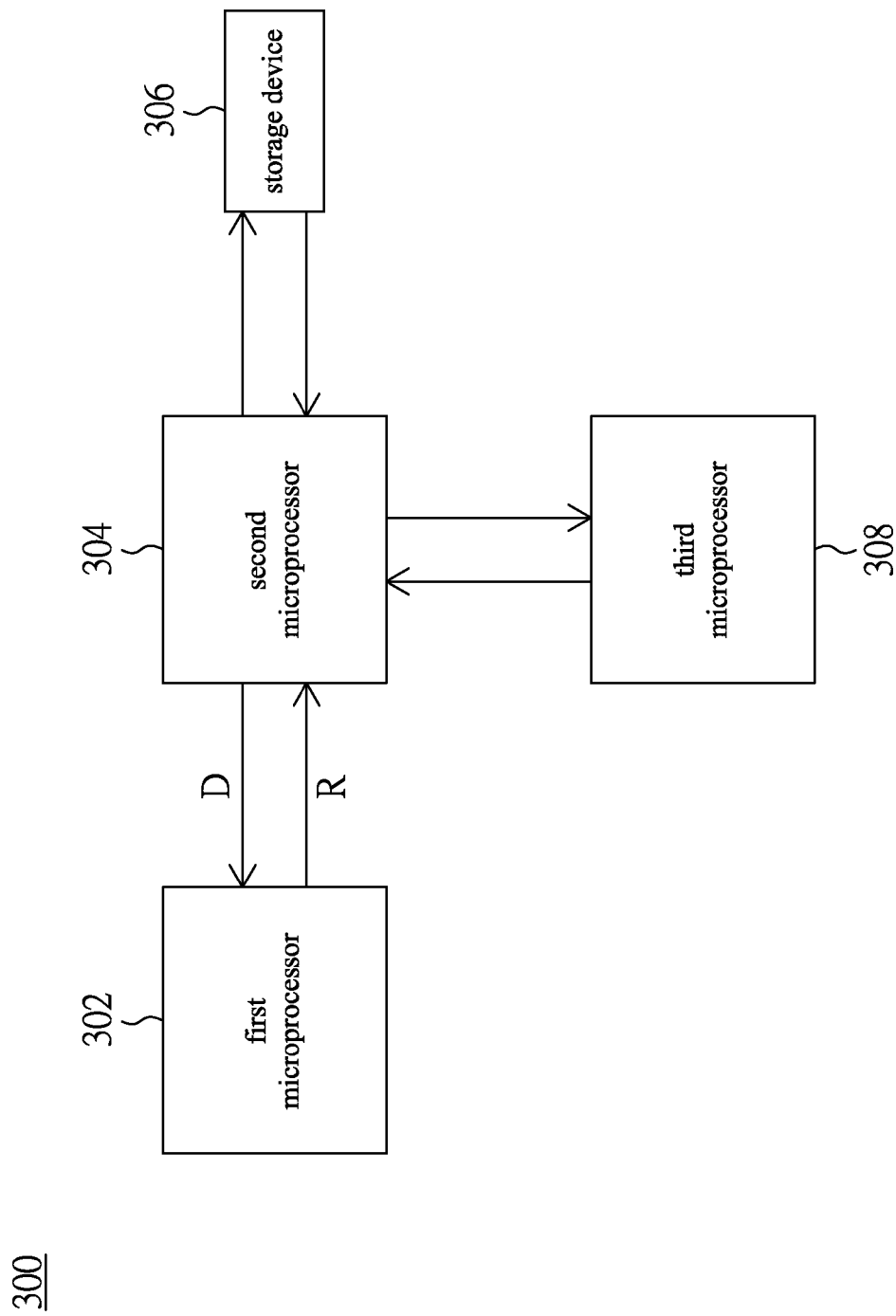
FIG. 3 is a block diagram of a multi-microprocessor system according to a second embodiment of the invention.

FIG. 3 shows a block diagram of a multi-microprocessor system according to a second embodiment of the invention. A multi-microprocessor system 300 comprises a first microprocessor 302, a second microprocessor 304, a third microprocessor 308, and a storage device 306. The second microprocessor 304 is coupled to the first microprocessor 302, and is for monitoring the first microprocessor 302.

A difference in the second embodiment from the first embodiment is that, in the event that the second microprocessor 304 determines the first microprocessor 304 is busy, the second microprocessor 304 transfers a share of task to be executed from the first microprocessor 302 to the third microprocessor 308, so as to reduce the load of the first microprocessor 302.

For example, the second microprocessor 304 controls the first microprocessor 302 to stop a share of task being performed by the first microprocessor 302. Via controls of the second microprocessor 304, the third microprocessor 308 performs the share of task disrupted from the first microprocessor 302 to reduce the load of the first microprocessor 302. Thus, by reducing the load of the first microprocessor 302, not only performance but also stability of the multi-microprocessor system 300 is optimized.

According to the above embodiments of the invention, the second microprocessor detects a state of the first microprocessor at all times by continually monitoring the first microprocessor. In the event that the first microprocessor crashes, the first microprocessor is immediately rest or restarted in order to maximize stability of the multi-microprocessor system. In the event that the first microprocessor is busy, the load of the first microprocessor is reduced to effectively optimize performance of the multi-microprocessor system. Further, by storing setting values in the storage device, conditions before the first microprocessor crashed are restored after reset or restart, thereby elevating usage convenience.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A multi-microprocessor system, comprising:
   a first microprocessor; and
   a second microprocessor, coupled to the first microprocessor;
   wherein, the second microprocessor transmits a first detect signal to the first microprocessor, and determines a state of the first microprocessor by monitoring the first microprocessor for a predetermined time period, wherein the second microprocessor determines the state of the first microprocessor according to whether a reply signal is received from the first microprocessor within the predetermined time period.

2. The multi-microprocessor system as claimed in claim 1, wherein the second microprocessor determines the state of the first microprocessor as being crashed or busy in the event that the second microprocessor does not receive the reply signal from the first microprocessor after the predetermined time period.

3. The multi-microprocessor system as claimed in claim 2, wherein the second microprocessor determines the first microprocessor is crashed or busy according to data in a register of the first microprocessor.

4. The multi-microprocessor system as claimed in claim 2, the second microprocessor reduces load from the first microprocessor when the first microprocessor is busy.

5. The multi-microprocessor system as claimed in claim 2, further comprising:
   a third microprocessor, coupled to the second microprocessor;
   wherein, when the first microprocessor is busy, the second microprocessor transfers a share of task from the first microprocessor to the third microprocessor for execution.

6. The multi-microprocessor system as claimed in claim 1, wherein the second microprocessor resets or restarts the first microprocessor in the event that the second microprocessor does not receive the reply signal from the first microprocessor after the predetermined time period.

7. The multi-microprocessor system as claimed in claim 6, further comprising:
   a storage device, coupled to the second microprocessor;
   wherein, before resetting or restarting the first microprocessor, the second microprocessor duplicates a setting value stored in the first microprocessor to the storage device, and loads the setting value stored in the storage device back to the first microprocessor after resetting or restarting the first microprocessor.

8. The multi-microprocessor system as claimed in claim 1, wherein the second microprocessor transmits a second detect signal to the first microprocessor in the event that the second microprocessor does not receive the reply signal from the first microprocessor after the predetermined time period.

9. A control method for a multi-microprocessor system, the multi-microprocessor system comprising a first microprocessor and a second microprocessor coupled to the first microprocessor, the method comprising:
   transmitting a first detect signal by the second microprocessor to the first microprocessor; and
   determining a state of the first microprocessor by the second microprocessor by monitoring the first microprocessor for a predetermined time period, wherein the second microprocessor determines the state of the first microprocessor according to whether a reply signal is received from the first microprocessor within the predetermined time period.

10. The control method as claimed in claim 9, further comprising:
    determining the state of the first microprocessor as being crashed or busy by the second microprocessor in the event that the second microprocessor does not receive the reply signal from the first microprocessor after the predetermined time period.

11. The control method as claimed in claim 10, further comprising:
    reading data in a register of the first microprocessor by the second microprocessor;
    wherein the second microprocessor determines the first microprocessor is crashed or busy according to the data in the register of the first microprocessor.

12. The control method as claimed in claim 10, further comprising:
    reducing load from the first microprocessor by the second microprocessor when the first microprocessor is busy.

13. The control method as claimed in claim 10, the multi-microprocessor system further comprising a third microprocessor coupled to the second microprocessor, the method further comprising:
    transferring a share of task from the first microprocessor to the third microprocessor for execution when the first microprocessor is busy.

14. The control method as claimed in claim 9, further comprising:
    resetting or restarting the first microprocessor by the second microprocessor in the event that the second microprocessor does not receive the reply signal from the first microprocessor after the predetermined time period.

15. The control method as claimed in claim 14, the multi-microprocessor system further comprising a storage device coupled to the second microprocessor, the method further comprising:
    duplicating a setting value stored in the first microprocessor to the storage device by the second microprocessor before the second microprocessor resets or restarts the first microprocessor, and loading the setting value stored in the storage device back to the first microprocessor after resetting or restarting the first microprocessor.

16. The control method as claimed in claim 9, further comprising:
    transmitting a second detect signal to the first microprocessor by the second microprocessor in the event that the second microprocessor does not receive the reply signal after the predetermined time period.

17. A multi-microprocessor system, comprising:
    a first microprocessor;
    a second microprocessor, coupled to the first microprocessor; and a storage device, coupled to the second microprocessor;

wherein, the second microprocessor transmits a first detect signal to the first microprocessor, and determines a state of the first microprocessor by monitoring the first microprocessor for a predetermined time period, wherein the second microprocessor determines the state of the first microprocessor according to whether a reply signal is received from the first microprocessor within the predetermined time period; and when a reply signal is not received from the first microprocessor within the predetermined time period, the second microprocessor duplicates a setting value stored in the first microprocessor to the storage device, resets or restarts the first microprocessor, and loads the setting value stored in the storage device back to the first microprocessor after resetting or restarting the first microprocessor.

* * * * *